May 9, 1939.  W. J. FOSTER  2,158,042

AIR CLEANER

Filed Sept. 5, 1936

Inventor
William J. Foster
By Blackmore, Spencer & Flint
Attorneys

Patented May 9, 1939

2,158,042

UNITED STATES PATENT OFFICE 2,158,042

AIR CLEANER

William J. Foster, Flint, Mich., assignor to General Motors Corporation, Detroit, Mich., a corporation of Delaware Application September 5, 1936, Serial No. 99,559

10 Claims. (Cl. 183—15)

This invention relates to air cleaners in which there are included a liquid reservoir and a filter element so arranged that the air to be cleaned picks up from the reservoir and carries into the filter element liquid which keeps the latter clean and moist.

When air cleaners of this type are used to clean the carburetor air supply of certain types of internal combustion engines, the air which passes through them picks up too much liquid from the reservoir when the engine is operating at high speeds and carries some of it through the filter element into the carburetor and cylinders of the engine. This is, of course, an undersirable characteristic.

This invention resides in an air cleaner of the mentioned type which is so designed that the undesirable characteristic referred to is eliminated.

For a better understanding of the nature of this invention, reference is made to the following specification wherein there is described the preferred embodiment of the invention which is illustrated in the accompanying drawing.

Figure 1:
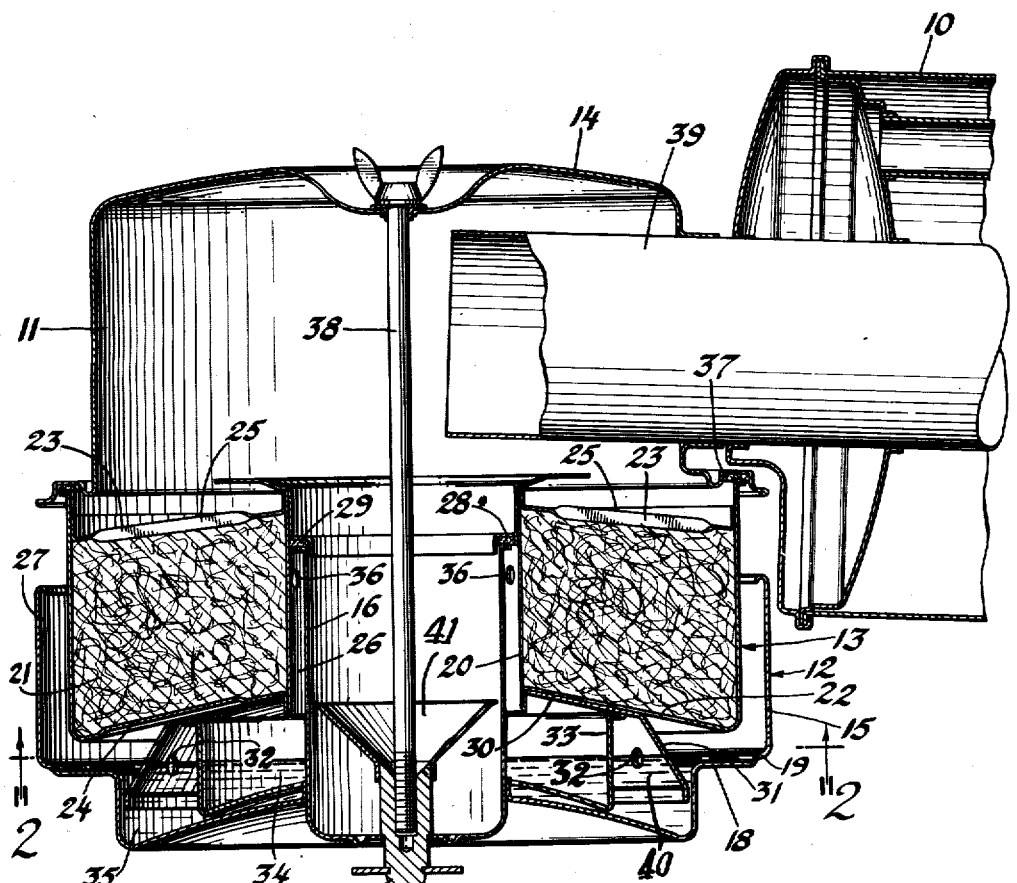
Figure 1 is a fragmentary view, mainly in section, through an air cleaner and silencer assembly in which there is incorporated an air cleaner in accordance with my invention.
Figure 2:
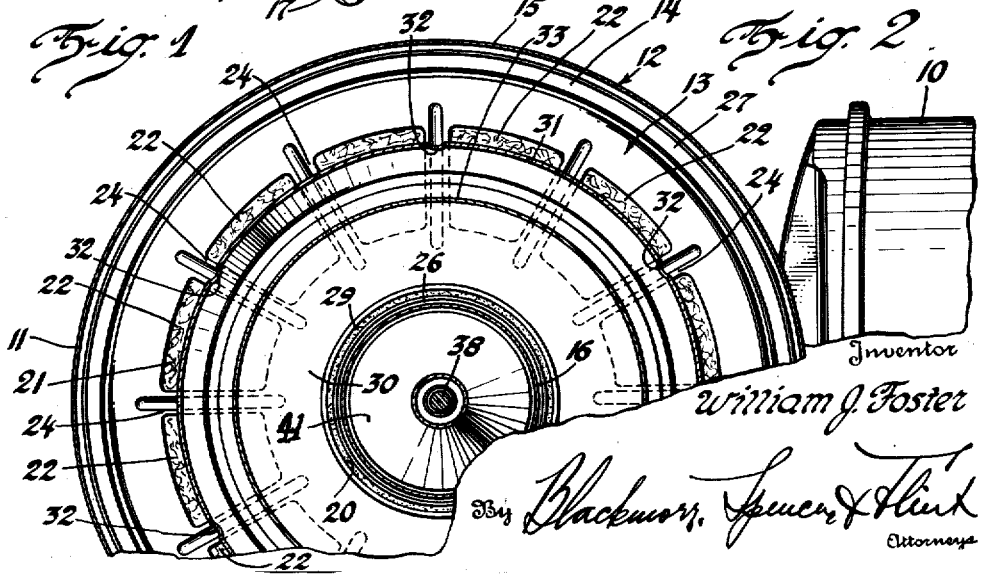
Figure 2 is a fragmentary section taken on the line 2—2 of Figure 1.

The air cleaner and silencer assembly shown in the drawing is of the type disclosed in the Kamrath application Serial No. 55,524 which was filed on December 26, 1935. In it there is included a resonator silencer 10 of the type disclosed in the Wilson application Serial No. 470,700 which was filed on July 25, 1930 and an air cleaner 11 of the type disclosed in the Blair application Serial No. 50,755 which was filed on November 20, 1935 modified in accordance with my invention.

The air cleaner 11 consists of an annular receptacular body 12, an annular filter element 13 whose lower end is disposed between the inner and outer side walls of the body and whose upper end projects above them and a cover 14 which is shaped generally like an inverted cup.

The body 12 is made up of a generally cup-shaped member 15 and a tube 16 which extends through and is secured in an orifice in the center of the bottom of the member 15. The lower end of the tube is closed by a head in which there is secured a stud 17. In the bottom of the body 12 next its outer side wall there is formed an annular shelf 18 which is disposed at a considerably higher level than the rest of the bottom. Before the air cleaner is put into use, the body 12 is filled with oil or some other suitable liquid 40 to about the level of the ledge 19.

The filter element 13 consists of a hollow annular member 20 which is filled with a suitable filter medium 21 such as that disclosed in the Webb application Serial No. 98,556 which was filed on August 29, 1936. In the lower and upper walls of the member 20 which are inclined outwardly and downwardly, there are annular series of orifices 22 and 23 which are separated by narrow bars 24 and 25. The inner cylindrical wall of the member 20 is made larger in diameter than the tube 16 so that there will be an annular aperture 26 between the telescoped parts of the elements when the body and the filter element are assembled. The outer cylindrical wall of the member 20 is made sufficiently smaller in diameter than the outer side wall of the body 12 that the telescoped parts of the elements will be separated by an annular aperture 27 about half as wide as the shelf 18 when the body and filter element are assembled. The lower outer edge of the member 20 is located a distance about equal to the width of the aperture 27 above the liquid level in the body 12. To support the filter element in the described position, there is secured to its inner cylindrical wall an annular member 28 which rests on the top of the tube 16. To seal the upper end of the aperture 26, there is interposed between the member 28 and the upper end of the tube 16 a compressible gasket 29.

Seated against and secured to the underside of the lower wall of the member 20 near its inner edge is an annular member 30 with an outwardly and downwardly inclined skirt 31 on its outer edge. The lower edge of the skirt is disposed about midway between the top and bottom of the riser which connects the shelf 18 and the depressed portion of the bottom of the body 12 and a short distance from the riser horizontally. Except for a number of perforations 32 in the skirt 31 at about the liquid level in the body 12, the member 30 is imperforate. To the member 30 at a distance from its inner edge, there is secured the upper end of the vertical leg of an annular member 33 which is angle-shaped in cross section. The other leg of the member 33 extends from the lower end of the vertical leg parallel to and a short distance above the depressed portion of the bottom of the body toward the tube 16, but terminates short thereof.

The member 33 is imperforate and with the member 30 divides the portion of the body 12 below the filter element 13 into two chambers 34 and 35 which communicate with each other below but not above the liquid level in the body. The lower end of the aperture 26 opens into the chamber 34 and the upper end thereof into the filter element through vents 36 in its inner cylindrical wall just below the annular member 28. Except for the orifices 36, the inner and outer cylindrical walls of the filter element are imperforate.

The open end of the cover 14 is seated on the upper edge of the outer cylindrical wall of the member 20 through the intermediary of a sealing gasket 37. The body 12, the filter element 13 and the cover 14 are secured together with the filter element clamped between the body and the cover by an elongated thumbscrew 38 which extends through the cover and is threaded into the stud 17. The funnel-like member 41 which is mounted on the upper end of the stud 17 serves to guide the thumbscrew 38 into the threaded bore in the stud.

The outer end of the central tube 39 of the silencer 10 extends through and is secured in an orifice in the side wall of the cover 14.

The assembly which is shown in the drawing was designed for installation on an internal combustion engine with the end of the silencer which is not shown in the drawing connected to the air intake tube of its carburetor. When the assembly is so installed and the engine is operating, the suction of the engine draws air through the aperture 27, around the lower outer edge of the filter element 13, upwardly through the filter element (by way of the orifices 22 in its lower wall, the interstices in the filter medium 21 and the orifices 23 in its upper wall) into the interior of the cover 14 and, thence, through the central tube 39 of the silencer 10 into the carburetor and cylinders of the engine. The air strikes the liquid on the shelf 18 with considerable force, deposits some of the dirt which it carries in the liquid and picks up some of the liquid and carries it into the filter element 13. The filter medium 21 removes from the air the dirt which remains in it and the oil entrained in it. Thus, the air is freed of dirt and the filter medium 21 kept moist. Any excess of liquid beyond that required to keep the filter medium moist drains back into the chamber 35 through the orifices 22 carrying with it the dirt removed from the air by the filter medium.

To the surface of the liquid in the chamber 34, there is applied the static pressure in the filter element at the orifices 36. To the surface of the liquid in the chamber 35, there is applied the static pressure plus the velocity pressure of the air at that point. It is, therefore, obvious that whenever the engine is operating the liquid in the chamber 35 is under a higher pressure than the liquid in the chamber 34. Moreover, the difference between the pressure on the surface of the liquid in the chamber 35 and the pressure on the surface of the liquid in the chamber 34 increases as the speed of the engine and the rate at which air passes through the air cleaner increases. Therefore, the level of the liquid in the chamber 34 rises and that in the chamber 35 falls as the rate at which air flows through the air cleaner increases. This lowering of the level of the liquid in the chamber 35 as the rate of flow of air through the air cleaner increases eliminates the tendency of the air to pick up too much liquid when the engine is operating at high speeds.

Although I consider it preferable to locate the vents 36 in the chamber 34 in the upper portion of the inner cylindrical wall of the filter element 13, they may be located elsewhere, e. g., at a lower level in the same wall, in the lower wall of the filter element or in the tube 16. If the vents are located in the tube 16, there may be connected to them tubes which extend up into the cover 14. The "horizontal" leg of the member 33 may be eliminated in some cases. The skirt 31 on the member 30 serves primarily as a baffle to inhibit weltering of the liquid within the chamber 35 and may be omitted if desired. But if it is used, its lower outer edge should be spaced from the riser which connects the shelf 18 to the depressed portion of the bottom of the body 12 so that liquid can pass therebetween and it should be so inclined that the velocity pressure of the air passing through the chamber 35 will oppose the passage of liquid from its inner to its outer side. The perforations 32 in the skirt 31 serve primarily to permit escape of air from the space between the skirt and the vertical wall of the member 33 so that it may be filled with liquid to the same level as the rest of the body 12 but, of course, also serve as pressure equalizing and liquid passages between the portions of the chamber 35 on the inner and outer sides of the skirt.

I claim:

1. In an air cleaner, a body in which there is included a cup-like member which constitutes a liquid reservoir, an annular member which subdivides the reservoir into two chambers of which one encircles the other and communicates with it below but not above the liquid level in the reservoir, an annular member which is disposed within and spaced from the side wall of the cup-shaped member so that it defines therewith a passage through which the air which enters the air cleaner is conducted toward the surface of the liquid in the outer of the mentioned chambers, and a vent through which the inner of the mentioned chambers is connected above the surface of the liquid therein to a region in which the pressure becomes increasingly less with respect to the pressure to which the liquid in the outer chamber is subjected as the rate of flow of air through the air cleaner increases so that the liquid level in the outer chamber will be lowered when the rate of flow of air through the air cleaner increases.

2. In an air cleaner, a body in which there is included a cup-like member which constitutes a liquid reservoir, an annular member which subdivides the reservoir into two chambers of which one encircles the other and communicates with it below but not above the liquid level in the reservoir, an annular member which is disposed within and spaced from the side wall of the cup-shaped member so that it defines therewith a passage through which the air which enters the air cleaner is conducted toward the surface of the liquid in the outer of the mentioned chambers, and a vent through which the inner of the mentioned chambers is connected above the surface of the liquid therein to the interior of the body beyond the outer of the mentioned chambers in the direction in which air travels through the body.

3. In an air cleaner, a body in which there is included an annular receptacular member which constitutes a liquid reservoir, an annular member which encircles the inner side wall of the annular receptacular member and subdivides the reservoir into two chambers of which one encircles the other and communicates with it below but not above the liquid level in the reservoir, an annular filter member which is disposed within the annular receptacular member with its outer side wall spaced from the outer side wall of the annular receptacular member so that it defines therewith a passage through which the air which enters the air cleaner is conducted toward the surface of the liquid in the outer of the mentioned chambers, and a vent through which the inner of the mentioned chambers is connected above the level of the liquid therein to the interior of the body beyond the outer of the mentioned chambers in the direction in which air travels through the body.

4. In an air cleaner, a body in which there is included an annular receptacular member which constitutes a liquid reservoir, an annular member which encircles the inner side wall of the annular receptacular member and subdivides the reservoir into two chambers of which one encircles the other and communicates with it below but not above the liquid level in the reservoir, an annular filter member which is disposed within the annular receptacular member with its inner side wall spaced from the inner side wall of the annular receptacular member so that it defines therewith an aperture whose lower end opens into the inner of the mentioned chambers and with its outer side wall spaced from the outer side wall of the annular receptacular member so that it defines therewith a passage through which the air which enters the air cleaner is conducted toward the surface of the liquid in the outer of the mentioned chambers, and a vent through which the mentioned aperture is connected to the interior of the body beyond the outer of the mentioned chambers in the direction in which air travels through the body.

5. In an air cleaner, a body in which there is included an annular receptacular member which constitutes a liquid reservoir, an annular filter member which is disposed within the annular receptacular member with its inner and outer side walls spaced, respectively, from the inner and outer side walls of the annular receptacular member so that they define therewith apertures whose lower ends open into the reservoir, an annular member which encircles the inner side wall of the annular receptacular member and is secured to the lower wall of the filter member between its inner and outer edges and extends into the reservoir and subdivides it into inner and outer chambers which are interconnected below but not above the liquid level in the reservoir and into which the lower ends of the mentioned inner and outer apertures open, respectively, and a vent in the inner side wall of the filter member through which the inner aperture is connected to the interior of the filter element near its upper end.

6. In an air cleaner, a body in which there is included a cup-like member which constitutes a liquid reservoir and whose end wall is stepped to provide an annular shelf near its outer edge and a section at a lower level which is encircled by the shelf, a filter member which is disposed within the cup-like member with its side wall spaced from the side wall of the cup-like member so that it defines therewith a passage through which the air which enters the air cleaner travels toward the shelf, and an annular baffle which extends outwardly and downwardly from above the liquid level in the reservoir to below the liquid level therein near but short of the riser which connects the shelf and the depressed portion of the end wall of the cup-like member in the path of travel of the air over the surface of the liquid in the reservoir and shields the inner but not the outer portion of the surface of the liquid in the reservoir from the current of air which travels through the air cleaner, the baffle being inclined so steeply downwardly that the velocity pressure of the air opposes passage of liquid through the aperture between the baffle and the riser into the outer portion of the reservoir.

7. In an air cleaner, a body in which there is included a cup-like member which constitutes a liquid reservoir and whose end wall is stepped to provide an annular shelf near its outer edge and a section at a lower level which is encircled by the shelf, a filter member which is disposed within the cup-like member with its side wall spaced from the side wall of the cup-like member so that it defines therewith a passage through which the air which enters the air cleaner travels toward the shelf, an annular member which is encircled by the riser which connects the shelf and the depressed portion of the bottom of the cup-shaped member and subdivides the reservoir into two chambers of which one encircles the other and communicates with it below but not above the liquid level in the reservoir, and an annular baffle over which the air passes in the course of its travel beyond the shelf inclined outwardly and downwardly to a point below the liquid level and near the mentioned riser so that the air tends to lower the level of the portion of the surface of the liquid not shielded by the baffle instead of to withdraw liquid from the other side of the baffle.

8. In an air cleaner, a body which includes a cup-like member which constitutes a liquid reservoir, a passage through which air which enters the air cleaner is conducted downwardly toward the surface of the liquid in the reservoir, over the surface of the liquid in the reservoir and then upwardly away from the surface of the liquid in the reservoir, means in the last mentioned section of the passage to remove from the air dirt and liquid picked up by it from the supply in the reservoir, a baffle which extends from below to above the liquid level in the reservoir in the path of travel of the air over the surface of the liquid in the reservoir and shields one but not another portion of the surface of the liquid in the reservoir from the current of air which passes through the air cleaner, and an orifice through which liquid may pass from one side to the other of the baffle below the liquid level in the reservoir offset toward the last mentioned section of the passage out of the line of travel of air through the first mentioned section of the passage, the baffle being inclined so steeply downwardly toward the lower end of the first mentioned section of the passage and the orifice that the velocity pressure of the air opposes passage of liquid through the orifice into the portion of the reservoir whose surface is not shielded by the baffle.

9. In an air cleaner, a body which includes a cup-like member which constitutes a liquid reservoir, a passage through which air which enters the air cleaner is conducted downwardly toward the surface of the liquid in the reservoir, over the surface of the liquid in the reservoir and then upwardly away from the surface of the liquid in the reservoir, means in the last mentioned section of the passage to remove from the air dirt and liquid picked up by it from the supply in the reservoir, a partition which subdivides the reservoir into a chamber into which the first mentioned section of the passage opens and a chamber which communicates with the first mentioned chamber below the liquid level in the reservoir and is vented so that when the rate of flow of air through the air cleaner increases liquid will be transferred from the first to the second mentioned chamber below the liquid level in the reservoir and the liquid level in the former lowered and in the latter raised, a baffle which extends from below to above the liquid level in the first mentioned chamber in the path of travel of the air over the surface of the liquid in the first mentioned chamber and shields one but not another portion of the surface of the liquid in the first mentioned chamber from the current of air which passes through the air cleaner, and an orifice through which liquid may pass from one side to the other of the baffle below the liquid level in the first mentioned chamber offset toward the last mentioned section of the passage out of the line of travel of the air through the first mentioned section of the passage, the baffle being inclined so steeply downwardly toward the lower end of the first mentioned section of the passage and the orifice that the velocity pressure of the air opposes passage of liquid through the orifice into the portion of the first mentioned chamber whose surface is not shielded by the baffle.

10. In an air cleaner, a body which includes a cup-like member which constitutes a liquid reservoir, an annular member through which air is conducted away from the surface of the liquid in the reservoir disposed within the cup-like member so that air which enters the air cleaner is conducted between it and the side wall of the cup-like member toward the surface of the liquid in the reservoir and above the surface of the liquid in the reservoir into the annular member, means within the annular member to remove from the air conducted through it away from the surface of the liquid in the reservoir dirt and liquid picked up by it from the supply in the reservoir, an annular partition which extends from above to below the liquid level in the reservoir and subdivides it into an annular chamber into which the passage between the annular member and the side wall of the cup-like member opens and a chamber which is encircled by and communicates with the annular chamber below the liquid level in the reservoir and is vented so that when the rate of flow of air through the air cleaner increases liquid will be transferred from the annular to the second mentioned chamber below the liquid level in the reservoir and the liquid level in the former lowered and in the latter raised, and an annular baffle which encircles the partition and extends from below to above the liquid level in the annular chamber in the path of travel of the air over the surface of the liquid in the annular chamber and shields the inner but the outer portion of the surface of the liquid in the annular chamber from the current of air which travels through the air cleaner.

WILLIAM J. FOSTER.

---

CERTIFICATE OF CORRECTION

Patent No. 2,158,042. May 9, 1939.

WILLIAM J. FOSTER.

It is hereby certified that error appears in the printed specification of the above numbered patent requiring correction as follows: Page 4, second column, line 30, claim 10, after the word "but" insert not; and that the said Letters Patent should be read with this correction therein that the same may conform to the record of the case in the Patent Office.

Signed and sealed this 13th day of June, A. D. 1939.

(Seal)

Henry Van Arsdale
Acting Commissioner of Patents.

the reservoir into a chamber into which the first mentioned section of the passage opens and a chamber which communicates with the first mentioned chamber below the liquid level in the reservoir and is vented so that when the rate of flow of air through the air cleaner increases liquid will be transferred from the first to the second mentioned chamber below the liquid level in the reservoir and the liquid level in the former lowered and in the latter raised, a baffle which extends from below to above the liquid level in the first mentioned chamber in the path of travel of the air over the surface of the liquid in the first mentioned chamber and shields one but not another portion of the surface of the liquid in the first mentioned chamber from the current of air which passes through the air cleaner, and an orifice through which liquid may pass from one side to the other of the baffle below the liquid level in the first mentioned chamber offset toward the last mentioned section of the passage out of the line of travel of the air through the first mentioned section of the passage, the baffle being inclined so steeply downwardly toward the lower end of the first mentioned section of the passage and the orifice that the velocity pressure of the air opposes passage of liquid through the orifice into the portion of the first mentioned chamber whose surface is not shielded by the baffle.

10. In an air cleaner, a body which includes a cup-like member which constitutes a liquid reservoir, an annular member through which air is conducted away from the surface of the liquid in the reservoir disposed within the cup-like member so that air which enters the air cleaner is conducted between it and the side wall of the cup-like member toward the surface of the liquid in the reservoir and above the surface of the liquid in the reservoir into the annular member, means within the annular member to remove from the air conducted through it away from the surface of the liquid in the reservoir dirt and liquid picked up by it from the supply in the reservoir, an annular partition which extends from above to below the liquid level in the reservoir and subdivides it into an annular chamber into which the passage between the annular member and the side wall of the cup-like member opens and a chamber which is encircled by and communicates with the annular chamber below the liquid level in the reservoir and is vented so that when the rate of flow of air through the air cleaner increases liquid will be transferred from the annular to the second mentioned chamber below the liquid level in the reservoir and the liquid level in the former lowered and in the latter raised, and an annular baffle which encircles the partition and extends from below to above the liquid level in the annular chamber in the path of travel of the air over the surface of the liquid in the annular chamber and shields the inner but the outer portion of the surface of the liquid in the annular chamber from the current of air which travels through the air cleaner.

WILLIAM J. FOSTER.

CERTIFICATE OF CORRECTION

Patent No. 2,158,042.　　　　　　　　　　May 9, 1939.

WILLIAM J. FOSTER.

It is hereby certified that error appears in the printed specification of the above numbered patent requiring correction as follows: Page 4, second column, line 30, claim 10, after the word "but" insert not; and that the said Letters Patent should be read with this correction therein that the same may conform to the record of the case in the Patent Office.

Signed and sealed this 13th day of June, A. D. 1939.

(Seal)　　　　　　　　　　　　　　　Henry Van Arsdale
　　　　　　　　　　　　　　　Acting Commissioner of Patents.